United States Patent [19]

Oomen et al.

[11] 4,307,351

[45] Dec. 22, 1981

[54] GAS LASER

[75] Inventors: Gijsbert L. Oomen; Wilhelmus J. Witteman, both of Enschede, Netherlands

[73] Assignee: Stichting voor Fundamenteel Onderzoek der Materie, Netherlands

[21] Appl. No.: 92,675

[22] Filed: Nov. 9, 1979

[30] Foreign Application Priority Data

Nov. 10, 1978 [NL] Netherlands .................. 7811163

[51] Int. Cl.³ ............................................. H01S 1/06
[52] U.S. Cl. ............................................. 331/94.5 G
[58] Field of Search ................... 331/94.5 G, 94.5 C; 313/225, 226

*Primary Examiner*—William L. Sikes
*Assistant Examiner*—Léon Scott, Jr.
*Attorney, Agent, or Firm*—Leydig, Voit, Osann, Mayer & Holt, Ltd.

[57] ABSTRACT

A gas laser for emitting ultraviolet laser light with a wave length of 248–249 nm, the gas mixture in the resonance chamber containing krypton, fluor or a fluor compound, and argon in such quantities that at room temperature the partial argon pressure exceeds 0.5 bar and the partial pressure of krypton and fluor or the fluor compound is smaller than 0.2 bar. The gas mixture in the resonance chamber also contains neon in such a quantity that its partial pressure at room temperature is at least equal to that of the argon.

4 Claims, 1 Drawing Figure

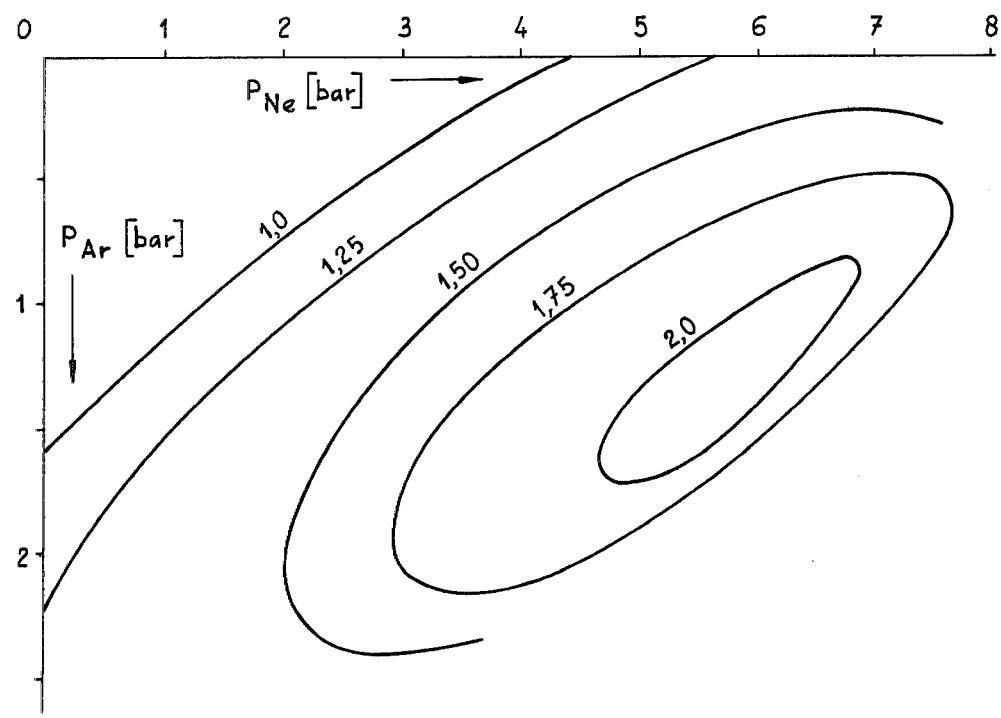

GAS LASER

The invention relates to a gas laser for emitting ultraviolet laser light with a wave length of 248-249 nm, the gas mixture in the resonance chamber containing krypton, fluor or a fluor compound, and argon in such quantities that at room temperature the partial argon pressure exceeds 0.5 bar and that the partial pressure of krypton and fluor or the fluor compound is smaller than 0.2 bar.

Such a laser is known from the article "high-efficiency KrF excimer laser" by M. L. Bhaumik et al., published in "Applied Physics Letters", Vol. 28, Nr. 1 (Jan. 1, 1976) pp. 23-24. This article describes a laser emitting ultraviolet light with a wave length of 249 nm. The resonance chamber contains a mixture of Ar, Kr and $NF_3$ (in the ratio 1300:130:1) at a total pressure of 2.25 bar. An energy of 1.5 Joule was emitted during a pulse with a pulse width of 125 nsec. The pumping energy was obtained from an electron beam.

The invention is based on the discovery that the output of such a gas laser can be substantially increased by adding neon to the gas mixture in the resonance chamber.

Consequently, the invention relates to a laser of the kind indicated above, which laser according to the invention is characterized by the gas mixture in the resonance chamber also containing neon in such a quantity that its partial pressure at room temperature is at least equal to that of argon.

More in particular, the invention relates to such a gas laser in which the partial pressure of argon is between 0.5 and 2 bar and the partial pressure of neon is between 5 and 7 bar.

Experiments were carried out with an apparatus comprising a Marx generator and a Blumlein with the aid of which electrons having an energy of 750 keV and a maximum current density of 100 A/cm$^2$ could be injected into the laser gas. The pulse width amounts to 30 nsec. The resonance chamber having a diameter of 4 cm is transversally excited by the electron beam over a length of 50 cm. The mirrors have a diameter of 4 cm and are positioned immediately near the resonator at a mutual distance of 85 cm. The laser energy coupled out of the resonator is measured by a Gen-Tec ED 500 pyroelectric detector. Part of the laser beam can be intercepted and via an attenuation means be focussed on a fast photodiode (ITT F 4115, starting period 1.5 nsec). The largest output was obtained with a flat Al mirror coated with $MgF_2$ and a plan-parallel quartz plate for coupling out.

An optimal energy of 1.35 Joule per pulse was obtained at the following composition of the three component gas mixture; partial krypton pressure 100 mbar, partial $NF_3$ pressure 1.3 mbar and partial argon pressure 2.5 bar.

The output energy of the laser is substantially increased by adding neon to the gas mixture. The maximum energy of 2.1 Joule per pulse with a pulse width of 30 nsec is emitted when the gas mixture has the following composition; partial krypton pressure 100 mbar, partial $NF_3$ pressure 1.3 mbar, partial argon pressure 1.5 bar and partial neon pressure 5.5 bar.

In the drawing the amount of emitted energy is plotted against the partial pressures in bar of argon and neon respectively. The graph relates to a constant partial $NF_3$ pressure of 1.3 mbar and a constant partial krypton pressure of 100 mbar. The incident electron beam is also kept constant.

The graph shows that the largest output is obtained at a partial argon pressure of 0.5-2.5 bar and more in particular of 1-2 bar and at a partial neon pressure of 3-8 bar and more in particular of 5-7 bar.

We claim:

1. In a gas laser having a resonance chamber for emitting ultraviolet laser light with a wave length of 248-49 nm, a gas mixture in the resonance chamber comprising: krypton, fluor or a fluor compound, argon and neon gas, each gas exerting a partial pressure in the chamber and in such quantities that at room temperature the partial argon pressure exceeds 0.5 bar, the partial pressure of krypton and fluor or the fluor compound is smaller than 0.2 bar, and the partial neon pressure at room temperature is at least equal to that of the argon.

2. In a gas laser according to claim 1, in which the fluor compound is $NF_3$.

3. In a gas laser according to claim 2, in which the partial pressure of krypton amounts to about 100 mbar, that of $NF_3$ to about 1.3 mbar, that of argon to 0.5-2.5 bar and that of neon to 3-8 bar.

4. In a gas laser according to claim 3, in which the partial pressure of argon is 1-2 bar and that of neon 5-7 bar.

* * * * *